United States Patent Office 3,532,612
Patented Oct. 6, 1970

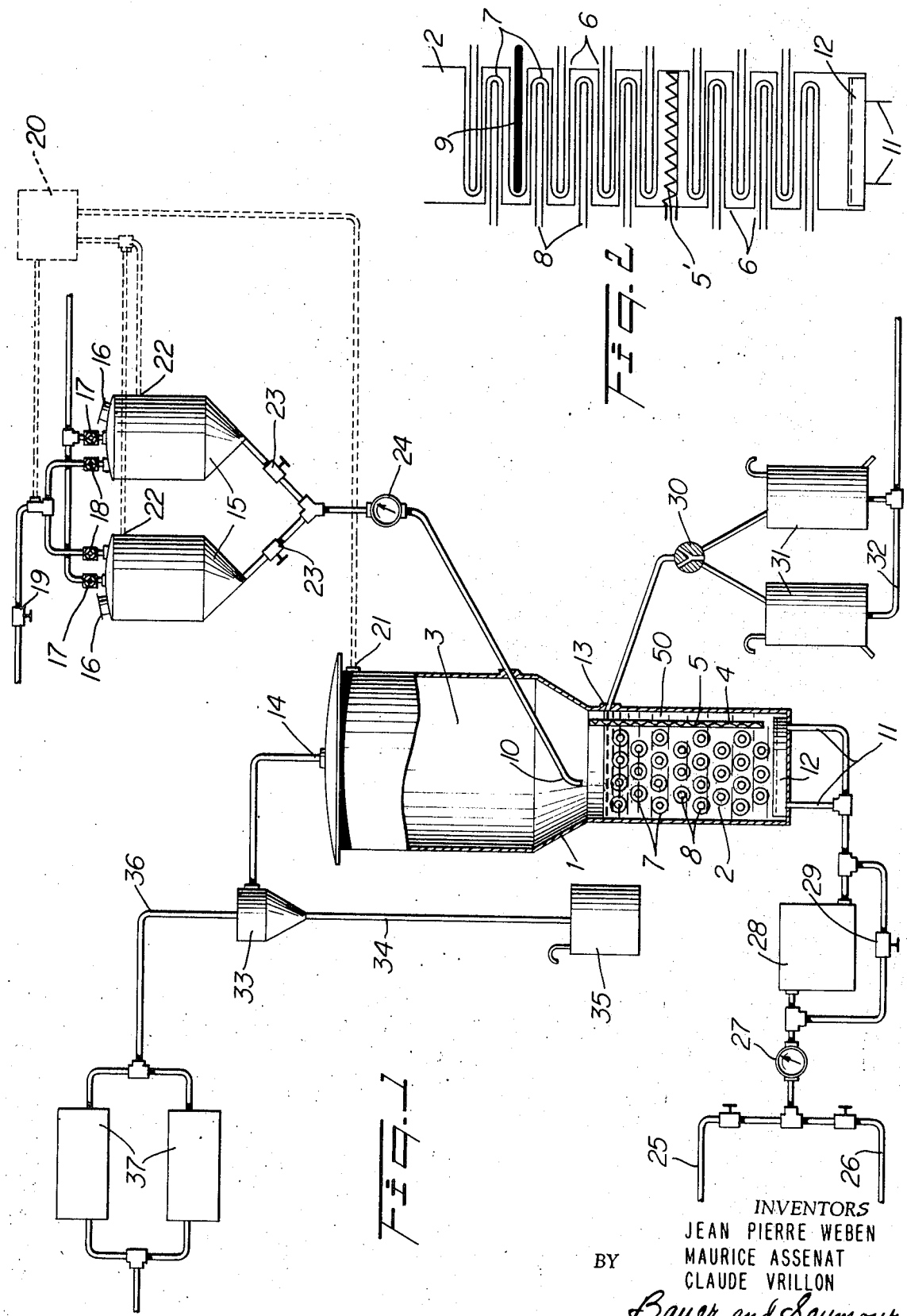

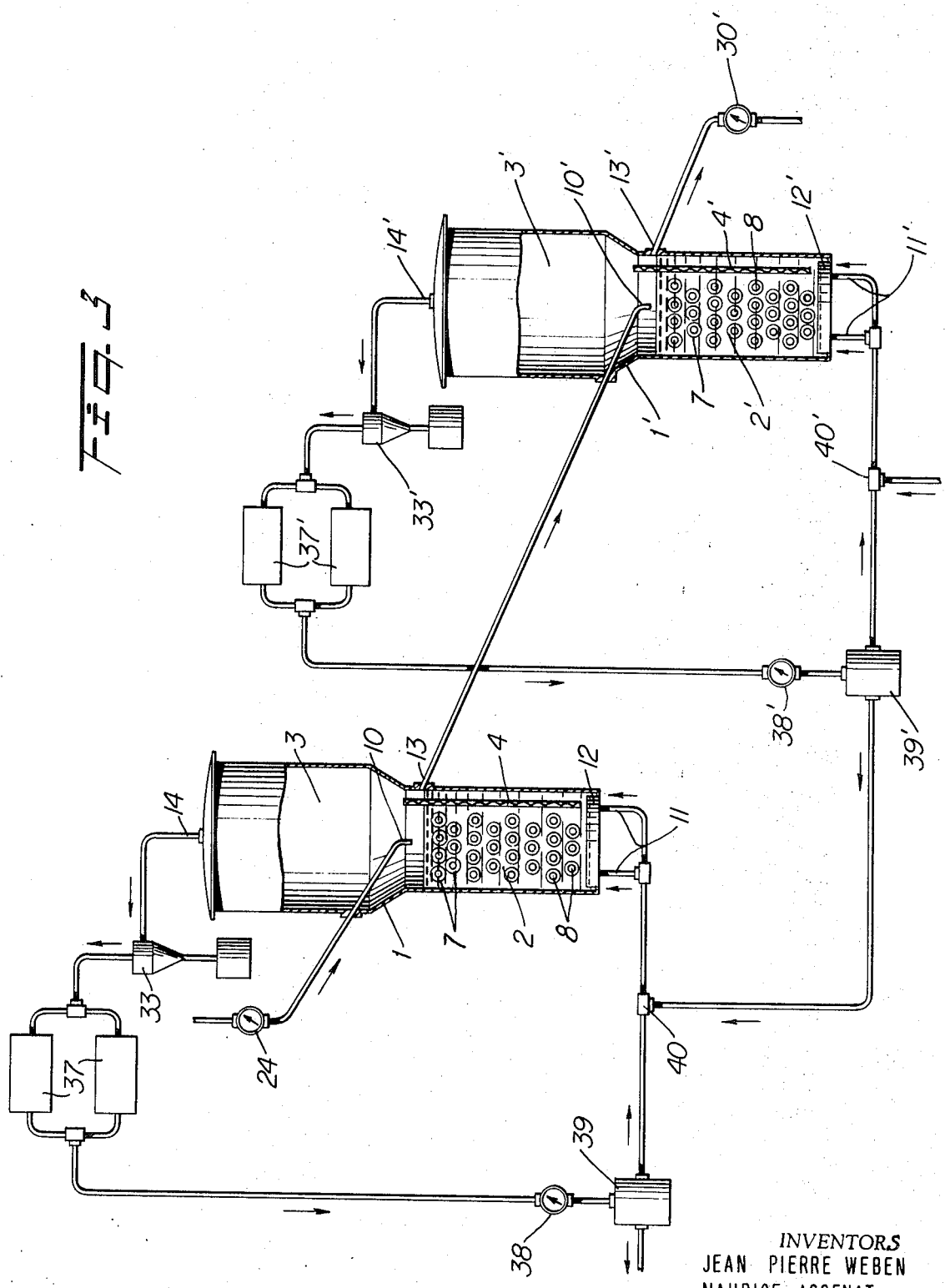

3,532,612
SUPERCHLORINATED POLYVINYL CHLORIDES AND METHODS OF PREPARATION
Jean-Pierre Weben, Saint-Cloud, Maurice Assenat, Saint-Fons, and Claude Vrillon, Montmagny, France, assignors to Produits Chimiques Pechiney-Saint Gobain, Paris, France
Filed Jan. 14, 1966, Ser. No. 520,770
Claims priority, application France, Jan. 15, 1965, 2,099; Dec. 16, 1965, 42,648
Int. Cl. C08f 1/16; C08j 1/02
U.S. Cl. 204—159.18                                10 Claims

ABSTRACT OF THE DISCLOSURE

Polyvinyl chloride is superchlorinated by a novel process and novel apparatus which carry out the superchlorination by fluidizing the reaction mass with gaseous chlorine. The process also contains novel conditions of reaction which are best comprehended by reference to the specification.

---

This invention relates to the superchlorination of polyvinyl chloride. According to the invention, the polyvinyl chloride is superchlorinated in the dry particulate state, under irradiation, in direct contact with a chlorinating gas, under conditions which are specified hereinafter. Novel apparatus is also described.

Heretofore polyvinyl chloride has been superchlorinated, but in the wet way, in solution or suspension in a liquid medium, in the presence of emulsifying or swelling agents in contact with chlorine gas. The process has been energized either catalyticly or by irradiation. Such processes, even batch processes, have required separation of the polymer from the liquid, and drying. The use of catalysts has resulted in an unstable product.

It is an object of the present invention to superchlorinate polyvinyl chloride continuously, in a dry process, and to eliminate liquid media, and separation therefrom. It is also an object to produce a product superior to polyvinyl chloride. The objects of the invention are accomplished, generally speaking, by chlorinating polyvinyl chloride in the dry state, under irradiation, in direct contact with a chlorinating gas, a bed of particulate polyvinyl chloride being maintained in a fluidizing state by the chlorinating gas.

It is also an object of the invention to provide apparatus for the process. Another object is to extend the invention to the solid state chlorination of other particulate bodies, paricularly to other polymers and copolymers of polyolefine and polyvinyl type which are capable of being chlorinated.

According to the present invention a reaction zone is provided, preferably a shaft in a container of constant volume, a bed of polyvinyl chloride particles is established in the shaft a current of gaseous chlorine, either alone or diluted by an inert gas, is introduced at the bottom at a velocity which establishes and maintains the particles in a fluidized state, and the particles are irradiated. As the superchlorinated product is withdrawn, it is replaced by an equal quantity of the raw material.

Any type of polyvinyl chloride can be superchlorinated by this process; for example the types which are produced in mass, in suspension, and in emulsion. It is advantageous to use polyvinyl chloride which has a porous grain structure in order to increase the surface of contact with the chlorine. An index of viscosity of the polyvinyl chloride may favorably be on the order of 95–160, its apparent density from .3 to .7 and its granulometry between 0 and 400 m$\mu$ with the fewest possible particles below 100 m$\mu$ because, while they are readily chlorinated, they can be entrained and swept out of the reaction zone by the chlorinating gas.

The process is applicable to raw materials which have already been partly superchlorinated.

The chlorinating gas may be pure chlorine or it may be chlorine mixed with inert gas, such as HCl, argon, or nitrogen.

It is advisable to carry out the chlorination at high speed, the speed of chlorination is a double function of the temperature of reaction and the partial pressure of chlorine in the reaction zone, and of the content of chlorine in the polymer undergoing treatment. It is a rising function of the reaction temperature and the partial pressure in the reaction zone and a decreasing function of the chlorine content of the polymer undergoing treatment. The chlorine content in polyvinyl chloride reaches a limit at a given partial pressure of chlorine. The minimum partial pressure of chlorine is a function of the polyvinyl chloride to be chlorinated. For example, polyvinyl chloride was prepared in mass according to French Pat. 1,382,072 and when chlorinated at 85° C., with a minimum partial pressure of .050 bar, the chlorine content approached the asymptotic limit of 64.4%. Likewise, but with a partial pressure of chlorine of .450 bar, this limit became 69% by weight. For each content of chlorine which is to be produced in the raw material, the operative partial pressure of chlorine should be superior to the minimum partial pressure which corresponds to the content of chlorine which is to be produced. According to this invention the ratio between the operative partial pressure and the minimum partial pressure is about 1.2 to 10, better between about 1.5 to 8, and best between about 3 to 6. When this relation is established the acceptance of chlorine by the chloride is the greater as the mean time of residence in tre reaction zone is the longer. The average residence is from 3 to 12 hours and preferably from 4 to 6 hours.

It has also been established that in order to obtain a reproducible chlorination the operative speed of the gas should be superior to the minimum speed of fluidization, superior to the critical speed of opacification of the transparent surfaces through which the radiation passes, and superior to the critical speed of crust formation; at the same time the speed should be below that which entrains a substantial quantity of particles in the chlorinating gas. The minimum speed of fluidization of the particles engaged in the reaction is about 1 cm. per second, the critical speed of opacification of the transparent surfaces through which radiation passes is the speed of the gas beneath which opaque films from on the walls, which is on the order of 4 to 6 cm. per second. If a film forms it can be removed by sufficiently increasing the rate of flow of the gas. The critical speed of formation of crusts is the speed of the gas below which crusts are formed, which is often at the level of 2 to 8 cm. per second, presumably because of insufficient fluidizing of the individual particles. When the agitation of the individual particles is insufficient, local overheating may bond particles together. The critical speed of crust formation is the higher as the speed of chlorination is higher.

It is advantageous to carry out the reaction in the absence of oxygen, which influences the speed of reaction and the thermal stability of the product. To avoid the arrest of the reaction and to obtain a better yield of chlorination and a more thermally stable polymer, one establishes a chlorination system in which there are not more than 500 p.p.m. of oxygen. This can be achieved by any known means, and when polyvinyl chloride is in work, by passing an inert gas through the particles or by evacuation before chlorination. When the polyvinyl chloride can be transferred directly from its production in mass, this preliminary operation is not necessary. As to the chlorine, a sufficiently low content of oxygen may be obtained by liquefication followed by vaporization.

In order to regulate the speed of the reaction and to control the fixation of chlorine on nonchlorinated carbon atoms of the chain, one may irradiate the fluidized particles of polyvinyl chloride by all sources of radiation, but preferably by those having a wave length in the ultraviolet or the visible. Wave lengths between 3500 and 6000 A. are particularly useful because they have little heating ecect on glass or quartz and this permits the use of glass tubes in place of the more costly quartz tubes. Other wave lengths have greater heating effect even though they may be equally efficient activators.

It is avantageous to carry out the chlorination reaction at a temperature high enough to permit rapid chlorination but below that at which melting of the polyvinyl chloride particles would occur. Favorable temperatures lie between 50 to 110° C. according to the nature of the product employed, to the quality of the product which is to be produced, and to the output of the apparatus. It is to be noted that the higher the temperature the more homogeneous should be the material. The reaction being exothermic, it is helpful to keep the temperatures constant inside the reaction zone. This can be accomplished by cooling the zone itself or by cooling the chlorinating gas before it enters, or both.

This process continuously produced superchlorinated polyvinyl chloride containing less than 5000 p.p.m. of free chlorine and less than 5000 p.p.m. of HCl. The product can be freed of such residual gases after isolation by known means, for example by sweeping them out with a nonreactive gas, or by evacuating the reaction space, or by pneumatic transportation, at a temperature below the softening temperature of the chlorinated polyvinyl chloride. The use of hot gas accelerates the departure of chlorine and HCl.

The gas issuing from the reaction zone includes excess chlorine, HCl formed in the reaction, and such inert gas as may be present. This may be used in other processes or recycled after removal of entrained particles.

According to an important modification of the process, the chlorination is carried out in a plurality of successive zones coresponding to successive stages including a recycling of the chlorinating gas through each reaction zone with an adjustment of the operative partial pressure of chlorine carried out at constant volume, and with a circulation from stage to stage of the polymer countercurrent to the flow of the chlorinating gas so as to increase the chlorine content while passing from one stage to the other, while at the same time the chlorinating gas is impoverished.

The above and further objects and novel features of the invention will more fully appear from the following description when the same is read in connection with the accompanying drawings. It is to be expressly understood however, that the drawings are for the purpose of illustration only, and are not intended as a definition of the limits of the invention.

The apparatus includes a reactor equipped with a heat exchanger for heating or cooling, with a system of irradiation, with a constant flow of particulate polyvinyl chloride, with means to introduce the chlorinating gas at fluidized pressure, and with means for continuously removing the superchlorinated polyvinyl chloride as it is formed and replaced. The apparatus also has means for evacuating such chlorine as has passed through the fluidized bed without reaction together with accompanying gases.

The drawings are diagrammatic flowsheets of the novel apparatus in which FIG. 1 is a vertical, sectional view, and a flowsheet of apparatus having a single reaction chamber;

FIG. 2 is a front elevational view of the reactor of FIG. 1;

FIG. 3 is a flowsheet of apparatus having a plurality of reaction zones.

According to FIG. 1 a container 1 has a lower section 2, which is adapted to contain the particulate solid and an upper section 3, which is normally occupied by the spent gas which escaped from the surface of the reaction mass. The section 2 is square and a baffle 4 extends from wall to wall adjacent one transverse wall and remote from the other, forming a kind of conduit 50 through which superchlorinated polyvinyl chloride resins are carried toward a discharge point 13. It should be noted that a fluidized solid acts as though it were a liquid and that the upward motion of the particles in the conduit 50 will be assisted by the flow of fluidizing gas. In the bottom of the shaft 2 is a distributor 12 through which the chlorinating gas is forced into the shaft throughout its width. Such devices are known and need no description. The distributor is supplied with gas through inlet 11 which receives the gas from a source of chlorine 25 and of inert gas 26 (which can be mixed in chosen proportions), and a debit meter 27. The latter regulates the rate of flow, which goes either directly by pipe 29 to the distributor, or through a heat exchanger 28 which can either heat or cool the incoming gas, as desired. Two hoppers 15 contain the PVC, or other material which is to be chlorinated, in particulate form and supply the bed in the reactor at a rate, established by the debit meter 24, which equals the rate at which the product is discharged at point 13. The hoppers 15 receive charges of particles through cover 16, are connected by valve 17 to a source of vacuum, and by valves 18 to a source of nitrogen under pressure. A pressure regulator 20 is located between the section 3 of the reaction chamber and the valve so that a continuous favorable pressure relation is established in the system. The parts 19, 20 and 21 can be omitted if desired.

The baffle 5 is equipped with a heat exchanger of coil type, either heating or cooling being provided for, to take care of any situation which may arise. Transparent sleeves project into the reaction chamber from opposite sides alternately and irradiating means 8 pass through the wall into these transparent sleeves as shown in FIG. 2. The sleeves may be of glass or of quartz. One or more of the sleeves may contain thermocouples 9, which assist in the control of the process, and some of the sleeves may be replaced by coils for heat exchange.

The gases in section 3 of the reactor escape through pipe 14 to cyclone 33 whence the solids fall to a vented receptacle 35 and the gases flow to one or the other of filters 37. In FIG. 3 the gases are recycled by a compressor 38 and a separator 39 whence part flows left to other uses and part right to be enriched at junction 40 by the gases from separator 39'. The gas which from separator 39' is enriched by chlorine at 40' and fluidifies the bed of particles in shaft 2', thence flowing as already described for such units. The two units of FIG. 3 are interconnected by a pipe 10' which receives its supply by overflow 13 and delivers it by cascade.

The following examples illustrate the invention without limiting the generality of what is elsewhere herein stated.

EXAMPLE 1

A tube of borosilicate glass 225 mm. in diameter and 1000 mm. in height was provided at its lower part with a filter cloth through which chlorine gas was delivered. The upper part of the tube, which constituted the reaction chamber, was equipped with an inlet for PVC, with a tube immersed in the fluidized mass which allowed the superchlorinated PVC to be withdrawn, and with a conduit for the withdrawal of gases. The tube was provided with a thermometer and five vertical, water cooled sleeves within which were radiation tubes furnishing a wave length of 4000 A. The glass tube contained a preparatory bed of 6000 g. of chlorinated PVC containing 65% of chlorine by weight. The mass was heated to about 60–65° C., irridiated, and fluidized by a current of chlorine of which the speed varied from 10–12 cm. per second. The pressure in the apparatus was kept at 1.2 bars. Fresh PVC of standard chlorine content circa 56.8% Cl was introduced at 1600 g. per hour. It had an index of viscosity of 150, an apparent density of .45 and a granulometry between 100 and 300 m$\mu$. It had previously been stripped of oxygen. The product was continuously withdrawn and was discharged through a lock so that the quantity of powder inside the reactor was constant. The mean time of residence of the PVC in the reactor was from 3–4 hours.

The product obtained, as recovered from the lock, was freed of chlorine and HCl, by passing a current of air at 20° C. through it. It was a white powder having the same appearance as the starting material. The chlorine content of all the superchlorinated product was about 65.5% by weight. The bending temperature under torsion (that is the temperature at which the modulus of torsion is equal to 31.5 kg./cm.$^2$ for a rectangular test specimen 100 mm. x 10 mm. x 4 mm. under torsion in a plane perpendicular to its longest dimensions, in an apparatus of the Clash and Berg type) was determined. The bending temperature under torsion was 98° C. and the bending temperature of the initial material under torsion was 80° C.

In order to compare the foregoing conditions of this process with altered conditions a like test was made under the same operative conditions but using a current of chlorine of 5 cm. per second instead of 10–12 cm. per second. A rapid opacification of the walls of the transparent sleeves took place and shortly there was a complete termination of chlorination because the light rays could no longer penetrate into the reaction zone.

EXAMPLE 2

Using the same apparatus as that of Example 1, 8000 g. of chlorinated PVC containing 69% by weight of chlorine was established as a bed, heated to 80–87° C., irradiated, and fluidized by chlorine flowing at a rate of 10–12 cm. per second. The pressure in the apparatus was as 1.4 bars. Ordinary PVC having an index of viscosity of 147, apparent density .47, and granulometry between 100–250 m$\mu$ for 97% of the particles and less than 100 m$\mu$ for 3%, was introduced at a rate of 1400 g. per hour. The PVC formed was withdrawn at the same rate. The mean time of residence of the PVC in the reactor was 5–6 hours. The white powder produced was freed of chlorine and HCl by hot air. The PVC produced contained 69% of chlorine by weight.

EXAMPLE 3

The apparatus used was that described in FIGS. 1 and 2. The reaction chamber 2 had a base 760 mm. x 545 mm. It was 1500 mm. high and contained 90 borosilicate glass sleeves 7, in which 87 ultraviolet lamps 8 emitted a wave length of 4000 A. It also contained 3 thermocouples 9. The chamber 3 had a diameter of 950 mm. and a height of 870 mm. The reaction chamber contained 250 kg. of chlorinated PVC as a powder containing 69% of chlorine. It was heated to 70–74° C., irradiated, and fluidized by chlorine at a temperature of 60–70° C. at 11 cm. per second. The rate of introduction of fresh PVC (56.8% chlorine by weight) was 40 kg. per hour. The temperature was kept at 70–74° C. by heating units 5 and 5′ and by varying the temperature of chlorine. The absolute pressure of 1.700 bars was maintained inside the reaction chamber. The superchlorinated product escaped by overflow 13 at a rate of 54 kg. per hour. It was degassed with air at 80° C. The PVC contained 69% of chlorine by weight. It was evacuated and packed for shipment.

The gas issuing from the reaction at 14 entrained fine particles of superchlorinated product (69% Cl) which was removed in the cyclone 33 and recovered at 35. This amounted to 1.2 kg. per hour.

For comparison the same test was made with a current of chlorine at a speed of 8 cm. per second, all other conditions being the same. The fluidization of the reaction mass was insufficient and crust formed.

EXAMPLE 4

The apparatus of the type of FIGS. 1 and 2 and Example 3 was used. The reaction chamber was 380 mm. long, 270 mm. wide and 1000 mm. high. It contained 32 transparent sleeves of borosilicate glass containing 31 ultraviolet lamps of 4000 A. wave lengths. It contained one thermocouple. The upper chamber was of the same area but 900 mm. high.

Operating as in Example 3 with 40 kg. of product in the reaction chamber, the chlorine used for reaction was replaced by a mixture of Cl and HCl containing 33% by volume of chlorine at 60–70° C. The rate of flow was 11 cm. per second. The fresh PVC was introduced at 4.2 kg. per hour. The temperature was about 80° C. and it was kept at this level by heat exchangers 5 and 5′ and by varying the temperature of the gas. The absolute pressure of 1.750 bars was maintained, which yielded a partial pressure of chlorine at .585 bar. The product was removed as in Example 3. This example was repeated six times except that the rate of introduction of the PVC was varied according to the following table.

| Rate of introduction of PVC in kg./hr.: | Percent by weight of chlorine in the product |
|---|---|
| 4.2 | 57.9 |
| 2.1 | 58.2 |
| 1.4 | 59.5 |
| 1.05 | 60.7 |
| 0.85 | 61 |
| 0.7 | 62.5 |
| 0.6 | 62.5 |

This shows that the chlorine content in the superchlorinated product is the greater as the rate of flow of the raw material is the slower, or in other words that the chlorination increases with increased exposure in the reaction zone. These results also show that the partial pressure of chlorine has practically attained the limit corresponding to the chlorine content of 62.5%. Even in further reducing the rate of flow of PVC through the reaction zone while maintaining a partial pressure of chlorine of .585 bar, the amount of chlorine fixed on the PVC remained substantially the same.

EXAMPLE 5

The apparatus used is shown in FIG. 3; the reactors 1, 1′ are identical, the chambers 2, 2′ are on a base of 380 mm. by 270 mm. by 1000 mm. high. They were each illuminated by ultraviolet light emitting rays of 4000 A. Each had one thermocouple. The chambers 3, 3′ were of the same base diameters as the lower chambers and of a height of 900 mm. The reactors 1, 1′ acted simultaneously. The reaction chamber 2 contained 42 kg. of chlorinated PVC containing about 64% by weight of chlorine. It was kept at 80° C., was irradiated, and was fluidized by a mixture of chlorine and HCl containing 11.6% of chlorine by volume. The rate of flow was 11 cm. per second and the absolute pressure was 1.750 bars which provided a partial pressure of chlorine of .200 bar. The ratio of the operative partial pressure of chlorine to the minimum partial pressure was between 4 and 4.5. The fresh PVC was obtained from polymerization in mass, contained 56.8% by weight of chlorine, and was admitted through regulator 24 at 6.65 kg. per hour. The circulating gas entered at 11 and the partial pressure of chlorine was maintained by adding 3.760 kg. per hour of a gaseous mixture of chlorine and HCl containing 66% of chlorine by volume, which was supplied by the separator system 39′. A volume of gas equal to that which was added was continuously removed at 39 from the mixture of chlorine and HCl, containing 9.66% of chlorine by volume, which escaped at 14. The overflow 13 supplied 7.900 kg. per hour of chlorinated PVC containing 64% of chlorine, of which 3.000 kg. per hour were withdrawn and represented a part of the production, whereas 4.9 kg. per hour were sent to the reaction chamber 2' for further chlorination. The mean time of residence of the particles in reaction chamber 2 was 5 hours 20 minutes. The reaction chamber 2' contained 48 kg. of chlorinated PVC containing about 69% by weight of chlorine at about 85° C. It was irradiated and fluidized with a mixture of gaseous chlorine and HCl at 67% of chlorine by volume. The speed of the gaseous mixture was about 11 cm. per second. The absolute pressure was 1.750 bars which furnished a partial pressure of chlorine at 1.17 bars. The ratio of the operative partial pressure of chlorine to the minimum partial pressure was between about 2.5 and 3. The PVC from chlorinator 2 was admitted with a chlorine content of 64%, at 4.9 kg. per hour.

The partial pressure of chlorine in pipes 11' was kept constant by adding 4.5 kg. per hour of gaseous chlorine. At 39' there was removed from the circulating gas (Cl-HCl at 66% Cl by volume) a volume corresponding to that which was added. At overflow 13' 5.75 kg. per hour of superchlorinated PVC containing 69% by weight of chlorine was discharged. The mean time of residence of the particles in the reaction chamber 2' was 8 hours 20 minutes. The overall yield of chlorine was 90% by weight.

For comparative purposes the same PVC containing 56.8% chlorine by weight was chlorinated in a single stage to a content of 69% of chlorine, but the yield in chlorine was only about 52% by weight. It is generally true that in a single stage process, where recycling of the fluidifying gas is not practiced, the yield of chlorine is only about 6% by weight.

The following general considerations will assist in comprehension of the process. At each successive stage of the chlorination there is a corresponding constant chlorine content in the chlorinated PVC. This chlorine content is established by the partial pressure of chlorine in the fluidizing gas, by the content of chlorine in the PVC which is being delivered to that stage, and by the time of residence in the stage.

According to a variation of the process, the PVC that is admitted to a first reaction zone possesses a certain content of chlorine which, in a typical case, may be 56.8%. At discharge the chlorine content is higher and it is passed to a second reaction zone where the chlorine content is again increased, and so on until in the final reaction zone the desired chlorine content is attained.

In the recycling circuit of the last stage the gas, after being reacted, has a partial pressure of chlorine lower than it had at admission because some of the chlorine has been fixed in the product and other has formed HCl. As the gas is recycled it is enriched by enough pure chlorine, or gas rich in chlorine, to establish the operative partial pressure of chlorine. The chlorination stage operates at constant volume, a volume of gas equal to the volume of chlorine added to the circuit (or equivalent), is withdrawn and sent toward the preceding stage to raise the operative partial pressure of chlorine in that stage. One, thus, proceeds stage by stage toward the first reaction zone wherein the operative partial pressure of chlorine is the lowest of all the stages. In this form of the invention one may add enriching gas to any one of the stages and may enrich any recycling stream by chlorine from another source other than of the preceding stage.

In this process it is possible to establish in advance the chlorine content which is to be produced at each stage by changing the operative partial pressure of chlorine, by changing the temperature of reaction, or both. Furthermore, it is possible to establish the quantities of chlorinated polymer which are to be produced in each stage by appropriate choice of the volume of each reaction zone. The ability to adjust the partial pressures of chlorine, and the temperatures of reaction, as well as the volume of each reaction zone (bed), has the advantage of permitting the manufacture in a single process of products of different degrees of chlorination. This is illustrated in one of the foregoing examples.

Fractions of PVC which have been superchlorinated to an intermediate chlorine content may be withdrawn for use; the quantity withdrawn corresponds to that part of the particles of superchlorinated polymer in excess of that which the following reaction zone is capable of processing.

This process is of great interest, because of the practically total use of the chlorine employed, which is not true of the processes of the prior art and is not even the case with the single stage process with or without individual recycling the gases. The results obtained without recycling are not equal to those obtained when the gas is recycled even in processes involving several stages.

It is possible to use a previously chlorinated PVC as a diluent in admixture with that which is to be chlorinated. When this is done there will be produced a mixture of superchlorinated PVC's having different chlorine contents, a product which is of substantial interest in certain fields of use.

The process is adapted to the preparation of superchlorinated PVC's having chlorine contents varying from 56.8 to 73.2%. These different levels of chlorine are obtained by varying the operative conditions as above indicated.

As many apparently widely different embodiments of the present invention may be made without departing from the spirit and scope thereof, it is to be understood that the invention is not limited to the specific embodiments.

What is claimed is:
1. A process of continuously chlorinating particulate polyvcinyl chloride in the absence of liquid media which comprises forming a bed of dry particles of superchlorinated polyvinyl chloride, fluidizing the bed by flowing a chlorinating gas, containing chlorine and an inert gas and containing no more than about 500 p.p.m. of oxygen, upwardly therethrough, irratiating the fluidized bed with actinic light through a window in contact with vertical portions of the fluidized bed, continuously introducing into the bed solid polyvinyl particles having a lower degree of chlorination than the particles constituting said bed, and continuously removing a stream of particles of polyvinyl chloride from said bed, removing the chlorinating gas from the top of said bed and recirculating the chlorinating gas to the bed, adding chlorine to the recirculated gas to maintain the chlorine content constant and removing an equal volume of gas, the particles of polyvinyl chloride being between 100 to 400 m$\mu$ with less than three percent below 100 m$\mu$, maintaining the temperature between 50 and 110° C., maintaining the velocity of the chlorinating gas substantially above the minimum velocity to fluidize the bed and sufficiently high to prevent the formation of crusts of particles and sufficiently high to prevent the formation of films upon the window.

2. A process according to claim 1 in which the irradiation is of wave length in the range of the ultraviolet and the visible.

3. A process according to claim 2 in which irradiation is by light circa 3500 to 6000 A., and is continued until a chlorine content between about 56.8 and 73.2% is imparted to the product.

4. A process according to claim 1 in which radiation of about 3500 to 6000 A. is passed into the bed through at least one transparent silicious body, the velocity of the chlorinating gas is above the speed of opacification of the silicious body.

5. A process according to claim 4 in which the product is pneumatically freed of entrained free chlorine and hydrochloric acid.

6. A process according to claim 5 in which the ratio of the operative partial pressure of chlorine to the minimum partial pressure of chlorine is between 1.2 and 10.

7. A process according to claim 6 in which the ratio is between 3 and 6.

8. A process according to claim 1 in which the chlorination is performed in separate stages and the particles flow through the stages, by being introduced as the particles continuously added to the stage with the lowest degree of chlorination and being transferred to a stage having a higher degree of chlorination from the stream of particles continuously withdrawn from said first mentioned stage as the particles continuously added to said second stage, and the chlorinating gas withdrawn from the gas recirculated in the stage of the highest degree of chlorination being introduced into the gas recirculating in a stage of lower degree of chlorination to add chlorine to said gas.

9. The process of claim 10 in which a bed of polyvinyl chloride having an index of viscosity about 95–160, apparent density about .3–.7, and granulometry not greatly superior to 400 m$\mu$ is established, such polyvinyl chloride is added thereto at a rate equaling the rate at which the super-chlorinated product is withdrawn, the mass is irradiated from a plurality of silicious radiators, and the mass is fluidified by chlorinating gas at a flow rate above that at which crusts form.

10. In a process for chlorinating particles of polyvinyl chloride at a temperature between 50 and 110° C. by visible or ultra violet radiation the steps of establishing a continuous flow of particles of dry polyvinyl chloride, fluidizing such particles by means of a chlorination gas of which the active agent is chlorine with or without inert gases, circulating the chlorinating gas countercurrent to the flow of the particles, establishing a speed of flow of the chlorinating gas superior to the critical speed of formation of crusts and superior to the critical speed of opacification of the transparent silicious parts of the irradiating system and continuously withdrawing the superchlorinated polyvinyl chloride from the zone of irradiation.

References Cited

UNITED STATES PATENTS

| | | | |
|---|---|---|---|
| 2,590,651 | 3/1952 | Rosenberg | 204—159.18 |
| 2,890,213 | 6/1959 | Noesne | 204—159.18 |

MURRAY TILLMAN, Primary Examiner

R. B. TURER, Assistant Examiner

U.S. Cl. X.R.

23—288; 204—193; 260—92.8